US006889820B2

(12) United States Patent
Rubie et al.

(10) Patent No.: US 6,889,820 B2
(45) Date of Patent: May 10, 2005

(54) EXCITER APPARATUS

(75) Inventors: Peter Rubie, Queensland (AU); John Russell, Queensland (AU); Paul Dalziel, Queensland (AU); Ben Plant, Queensland (AU)

(73) Assignee: Ludowici Mineral Processing Equipment PTY LTD, Queensland (AU)

(*) Notice: Subject to any disclaimer, the term of this patent is extended or adjusted under 35 U.S.C. 154(b) by 0 days.

(21) Appl. No.: 10/344,048

(22) PCT Filed: Aug. 6, 2001

(86) PCT No.: PCT/AU01/00956

§ 371 (c)(1),
(2), (4) Date: Jul. 2, 2003

(87) PCT Pub. No.: WO02/11905

PCT Pub. Date: Feb. 14, 2002

(65) Prior Publication Data

US 2004/0045877 A1 Mar. 11, 2004

(30) Foreign Application Priority Data

Aug. 9, 2000 (AU) .............................................. PQ9312

(51) Int. Cl.[7] ............................ B06B 1/16; A01F 12/44
(52) U.S. Cl. ....................................................... 198/770
(58) Field of Search ................................ 198/770, 759, 198/752.1, 751, 750.8

(56) References Cited

U.S. PATENT DOCUMENTS

| | | | | | |
|---|---|---|---|---|---|
| 3,796,299 A | | 3/1974 | Musschoot | | |
| 3,882,996 A | | 5/1975 | Musschoot | | |
| 4,272,366 A | * | 6/1981 | Dean et al. | ................. | 209/364 |
| 5,231,886 A | * | 8/1993 | Quirk et al. | .................... | 74/61 |
| 5,265,730 A | * | 11/1993 | Norris et al. | ............... | 209/326 |
| 5,762,176 A | * | 6/1998 | Patterson et al. | ........... | 198/770 |
| 6,142,292 A | * | 11/2000 | Patterson | .................... | 198/770 |
| 6,276,518 B1 | * | 8/2001 | Wierman | ................. | 198/752.1 |
| 6,601,695 B1 | * | 8/2003 | Rosenstrom | ............. | 198/750.1 |

FOREIGN PATENT DOCUMENTS

| | | |
|---|---|---|
| AU | 20043/95 | 11/1995 |
| DE | 4210507 | 11/1992 |
| GB | 1223157 | 5/1968 |
| WO | WO 02/11905 A1 | 2/2002 |

* cited by examiner

*Primary Examiner*—Douglas Hess
(74) *Attorney, Agent, or Firm*—Saliwanchik, Lloyd & Saliwanchik

(57) ABSTRACT

There is provided exciter apparatus having a cast housing (11) and mounting base (14) secured to mounts bolted to the side plates of screening apparatus. A pair of shafts are mounted for rotation in and extend out of both sides of the cast housing (11). A gear assembly is keyed to each shaft t form a gear train coupling the shafts. The outer ends of each of the shafts are provided with eccentric masses (30) aligned on their respective shafts 180° out of phase. Drive spools (35) are driven by electric motors (not shown). Coupling spools (37) are adapted to accept flexible couplings for joining exciter units together. The gears (26) comprise 9 teeth of an 18-tooth module at 325.0 mm pitch circle diameter (PCD) and 65 mm axial dimension. The lands between the teeth are at a notional diameter 262.6 mm, the teeth having a corresponding notional tooth height of 31.2 mm to the PCD. The gear tooth chordal length at 34 mm is oversize for the module and the gear tooth involute surface extends past the gear tooth addendum to meet a 6.5 mm radius tooth tip. This configuration gives a lash of 9°, which enables the direction of excitation to shift to track the center of gravity of the screen machine in use.

14 Claims, 5 Drawing Sheets

EXCITER APPARATUS

This application is a National Stage Application of International Application Number PCT/AU01/00956, published, pursuant to PCT Article 21(2).

FIELD OF INVENTION

This invention relates to exciter apparatus.

This invention relates particularly to exciter apparatus for use in minerals processing vibratory screens, and for illustrative purposes the invention is described hereinafter with reference to this application. However, it is to be understood that the principles underlying the present invention may be applied in other applications such as vibratory screening generally including grading nuts and other food processing applications.

BACKGROUND OF THE INVENTION

Vibrating screen machines for use in the mineral processing industries are commonly used to separate minerals such as coal or ores by size, usually after crushing. The apparatus generally comprises a screening deck having RHS or boxed I-beam screen support members, the screen support members being spaced apart to support the ends of modular screen inserts rigidly between side plates that are further interconnected by other cross members. The screen deck may be flat or may be curved to form a so-called banana screen. The screen apparatus is vibrated by exciter assemblies generally mounted on a heavy cross beam located at the top of the apparatus.

Australian patent specification AU-B-20043/95 describes a vibrational exciter for a screen machine comprising a pair of eccentric masses mounted for counter rotation on respective shafts, a pair of corresponding drive means disposed respectively to effect rotation of the eccentric masses and synchronization means adapted to establish a predetermined rotational velocity and phase relationship between the eccentric masses. The synchronization means allow effectively independent rotation thereof when the steady state of predetermined velocity and phase relationship is achieved. In practice this was achieved by the provision of 4 mm (1.43° of rotation) of lash. Since the gears do not transmit power in this steady state operation, there is a significant reduction in noise.

It has been determined that the direction of excitation should pass through the centre of gravity of the machine in use. However, as the screening apparatus wears, or panels are changed for a different brand, or the machine is loaded with a mass of material and progressively shifts this mass, the centre of gravity moves relative to the direction of vibration.

BRIEF SUMMARY OF INVENTION

In one aspect this invention resides an exciter apparatus including a pair of counter-rotating eccentric masses on respective driven shafts mounted for rotation in an exciter body on a screen machine, said masses having a phase relationship which provides a net direction of excitation; and adjustment means adapted to dynamically align said net direction of excitation with the centre of gravity of said screen in use.

DESCRIPTION OF INVENTION

The exciter assembly may comprise the type having a pair of shafts having corresponding drive means associated respectively with the shafts whereby the rotation of the respective masses may be synchronous. For example, there may be provided a gear arrangement on the respective shafts whereby the masses are maintained substantially synchronous in phase and speed. The synchronization means may be adapted to establish a predetermined velocity and phase relationship between the rotating eccentric masses and to allow effectively independent rotation thereof when the predetermined velocity and phase relationship is achieved.

It is recognized that the median direction of excitation is preferably provided whereby a line in that direction from the inertial divisor of the respective masses passes through the notional centre of gravity of the screen machine. The present applicant has determined that surprisingly as the centre of gravity of the machine shifts away from notional centre of gravity, the motion of the respective masses alters. The change results in the resolved components defining the direction of excitation shifting toward the centre of gravity of machine. What is observed is exciter tracks the centre of gravity.

As the screen panels wear the centre of gravity shifts slowly over time. When the machine is loaded, or as the load moves across the panel, the centre of gravity shifts over shorter time frames. The present applicant has determined that as the centre of gravity shifts over the short and longer periods, the provision of what would in the art be regarded as an unacceptably large amount of lash between the respective gears of apparatus such as that described in Australian patent specification AU-B-20043/95, enables the apparatus to track variations in the centre of gravity.

From this observation, the present applicant has established that the adjustment means may be provided by application of this property of allowing excessive lash, or that in the alternative, the direction of excitation may be adjusted by mechanically varying the excitation direction by, for example, mounting the exciter on a mounting assembly adapted to provide for movement thereof to align the excitation substantially with the centre of gravity as it is located from time to time. For example, there may be provided inertial sensing means that senses the current centre of gravity and may direct the operation of the mounting assembly whereby the direction of excitation continuously tracks the centre of gravity.

In the interest of simplicity it is preferred that the exciter assembly utilize the property of lash in an exciter having a gear synchronisation means, with up to 10° of lash being used. It has been determined by experiment that this amount of lash provides in some embodiments the boundary condition of sufficient synchronisation at start-up whilst allowing the exciter direction to track the centre of gravity in use. Preferably, the lash provided is about ±4.0 to 4.5° each side of zero lash, especially for screen apparatus of about 6.5 tonnes dwt and adapted to operate at about ±5 g.

Accordingly, in a further aspect this invention resides broadly in an exciter assembly for use in screening apparatus and including:

- eccentric masses mounted for counter rotation on respective driven shafts; and
- gear train means coupling the rotation of said shafts and having from 2 to about 10° of lash therein.

In view of the unusual configuration of a gear train having such a large amount of lash coupling the rotation of the shafts, there are particular features of the gear arrangement that are desirable. For example, it is desirable to increase the height of the tooth involute surface to increase duration of tooth engagement. The gears may be constructed having teeth substantially standard pattern of teeth according to this profile, with every second tooth removed. Preferably, the chordal length of each tooth is increased over the standard tooth chord by a degree selected to accommodate the expected shock loadings. Whilst the exact increase in chordal length is to be determined by testing, it is preferred that this dimension be maximised consistent with maintenance of the required lash.

The screen apparatus must be engineered massively to resist the damage occasioned by the vibrating action of the exciter causing resonance with at least one of the multiple modes of vibration of the apparatus in use. In turn the heavy construction requires more power to impart a selected vibration regime that would a lighter construction.

The most expensive fabrication on any conventional screen is the beam that supports the exciter gearboxes. These must be fabricated to exacting standards and in addition they must also be capable of transmitting the exciter force to the side plates. The present applicant has determined In a further aspect the present invention resides broadly in screening apparatus including:

a pair of opposed side walls;

an exciter assembly disposed on each of respective mounts provided on said side walls in the region of the upper cross beam therebetween, each exciter being of a selected operating frequency and comprising eccentric masses mounted for counter rotation on respective shafts, and adjustment means adapted to dynamically align the effective direction of excitation with the centre of gravity of said screening apparatus in use;

a torsion member rigidly secured between the side walls and providing said cross member, and screen deck support members disposed between said side walls, said side walls and torsion member being selected to provide that the first fundamental frequency mode greater than said frequency of operation is at least 2 Hz greater than said frequency of operation and the first fundamental frequency below said frequency of operation is at least 2 Hz lower than said frequency of operation. use.

The side plate profiles and stiffening are preferably modified until only the fundamental frequency modes remain. These frequency modes are modes are (1) with the side plates rotating out of phase, (2) with the side plates translating out of phase, (3) mode 1 lateral bending of the side plates and (4) mode 2 lateral bending of the side plates. The first three modes are low i.e. less than the operating frequency. The last is high i.e. greater than the operating frequency.

Both side plates are preferably provided with exciter mounts each located symmetrically over the upper edge of the respective side plates. The exciter mounts may be formed integrally with a mounting point for the torsion member or may be formed separately. Preferably, the exciter mount is formed as an integral casting including the torsion member mount and bolted to the side plates.

Unlike the prior art arrangements where the upper cross member both supported the exciter and braced the side plates, the present preferred exciter mount configuration allows the use of a torsion member in lieu of an exciter beam. The torsion member thus has no other function than permitting the tuning the torsional stiffness of the screen. The torsion member preferably take the form of a torsion tube. The torsion tube may be secured to the side plates, preferably to the integral exciter mount casting as described above, by any suitable means. For example the torsion tube may be welded to the casting, or if secured to the side plates may be secured by welding or via a tube mount welded or bolted to the side plates.

The feed box end of the apparatus, or other positions on the apparatus, may include further torsion members. These may be located at either end of the assembly. However, it is preferred that an end torsion member be located at the feed box end of the apparatus since this gives more location options, and stiffens the structure at the loading end. The torsion member again preferably comprises a torsion tube incorporated into the rear feed box torsion tube; this may also be varied to adjust the torsional stiffness of the apparatus.

Selection of the torsion members and in the case of the preferred tubular members the selection of the tube diameters enables the lowering of the side plate torsion mode to greater than at least 2 and preferably about 4 hertz below the operating frequency of typically 16 Hz. Thereafter the side plate stiffening may be varied to adjust mode 1 and 2 bending of the side plates to separate these modes by preferably more than 2 and about 4 hertz either side of the operating frequency. The selection of these parameters permits tuning of the screen apparatus to give an operating window of at least 4 and preferably 8 hertz. With traditional screens it is usually necessary to work with a window sometimes as small as 2 hertz.

The combination of the exciter in accordance with the foregoing and the large operating window of the screen apparatus reduces the power requirement and reduces the susceptibility of the structure to the natural frequency shifts caused by the variations in screen panel brand and age.

BRIEF DESCRIPTION OF THE DRAWINGS

The invention is further described by reference to preferred embodiments illustrated in the accompanying figures, and wherein.

DESCRIPTION OF THE PREFERRED EMBODIMENTS

Figure 1:
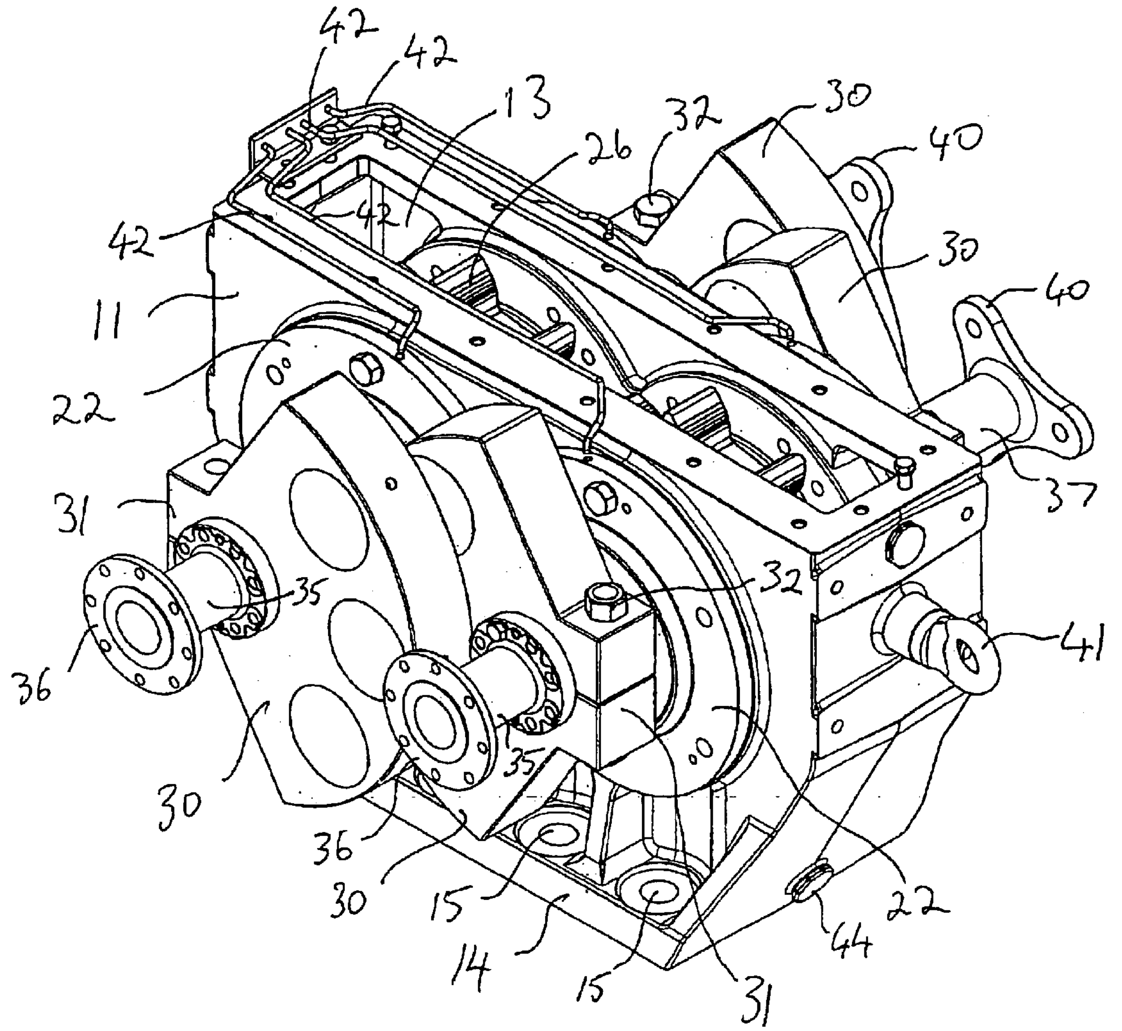
FIG. 1 is a perspective view of apparatus in accordance with the present invention.
Figure 2:
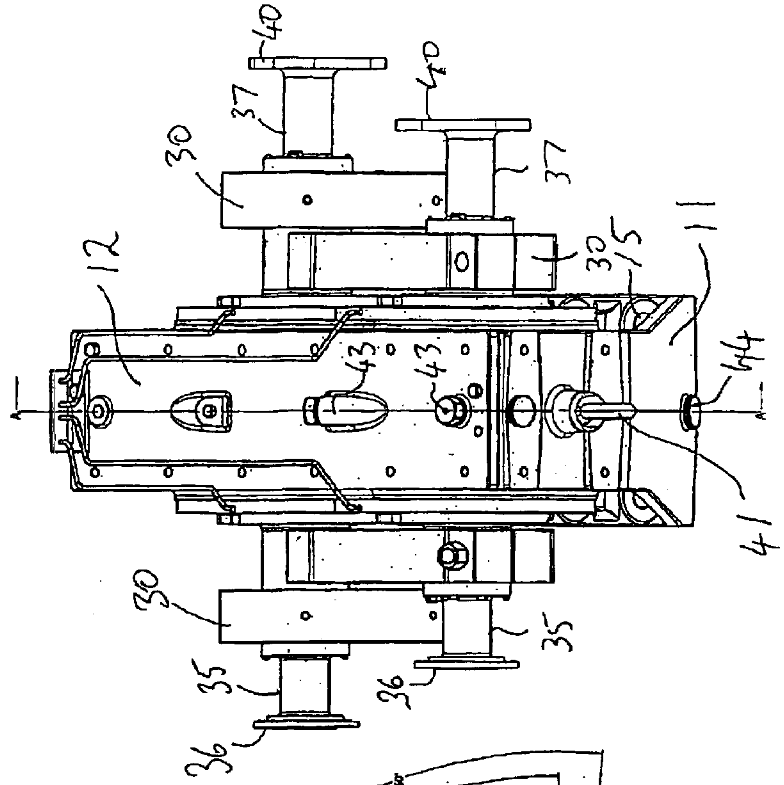
FIG. 2 is a plan view of the apparatus of FIG. 1.
Figure 3:
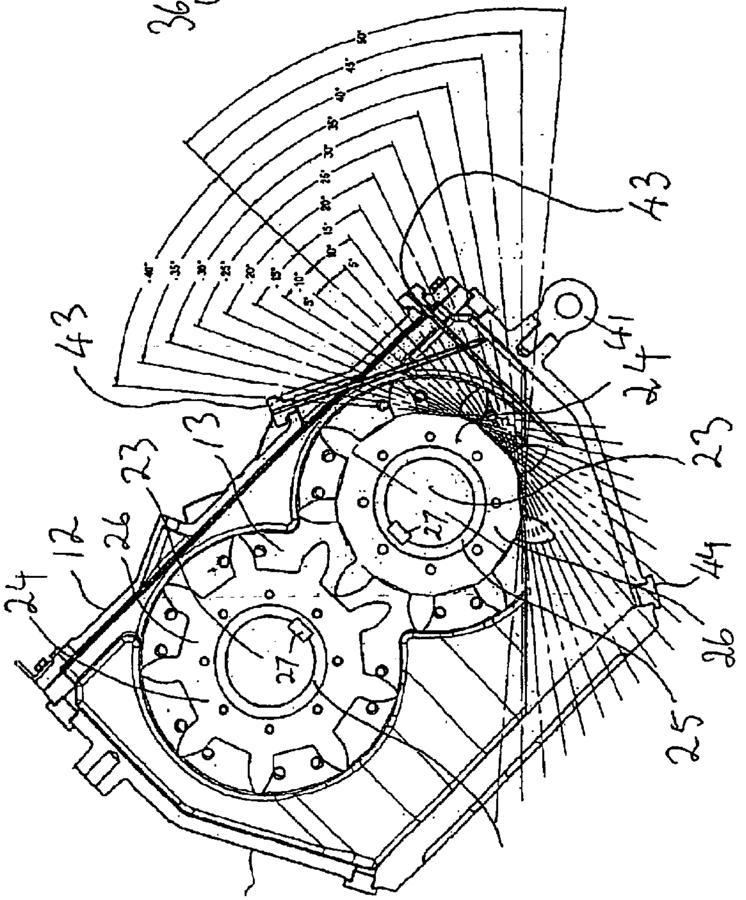
FIG. 3 is the section A—A through the apparatus of FIG. 2.
Figure 4:
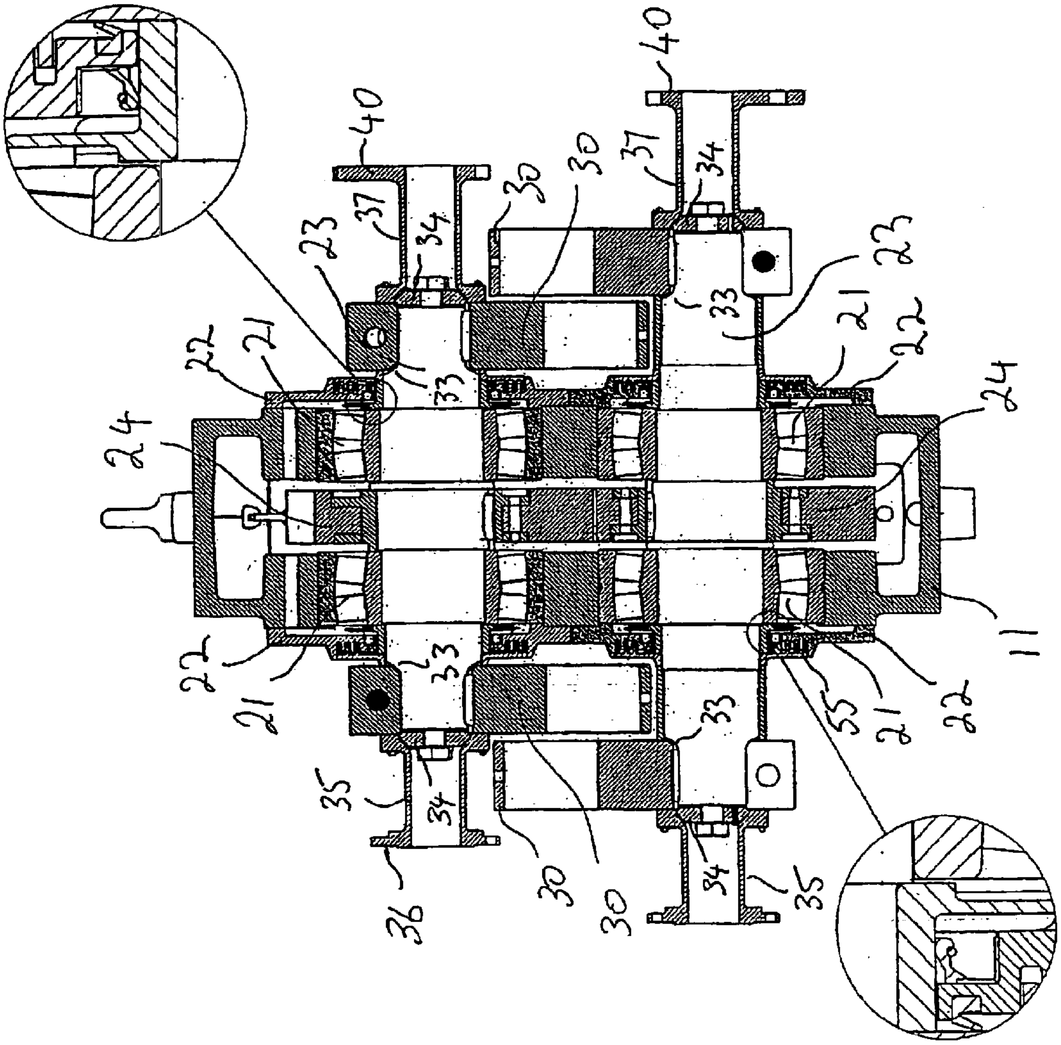
FIG. 4 is a horizontal section through the apparatus of FIG. 1.
Figure 7:
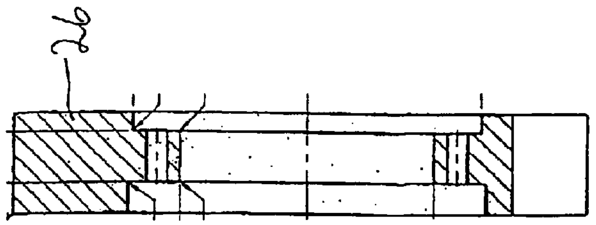
FIG. 7 is the section A—A through the gear of FIG. 6.
Figure 6:
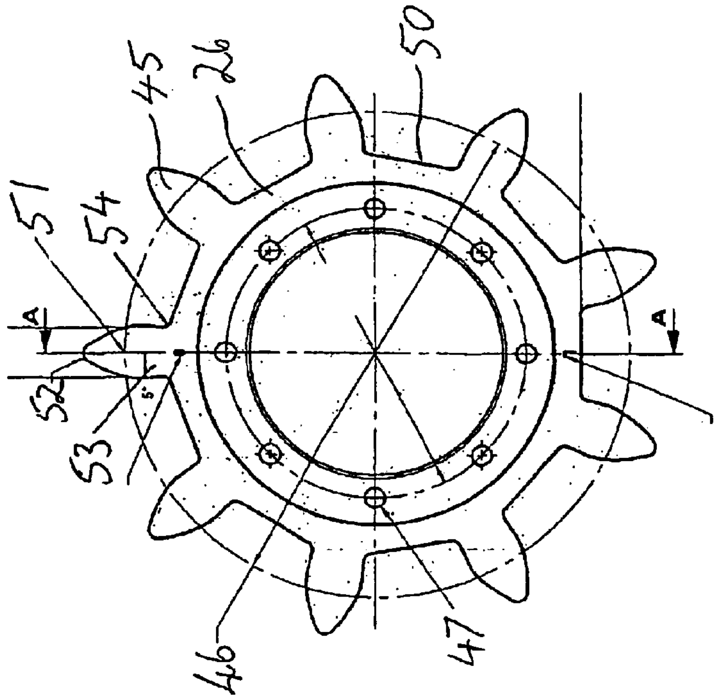
FIG. 6 is an elevation of the gear of FIG. 5.
Figure 5:
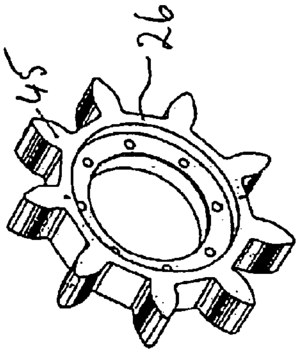
FIG. 5 is a perspective view of a gear for use in the apparatus of FIG. 1.

In the figures there is provided exciter apparatus 10 having a cast housing 11 and closure 12 defining a sealed cavity 13. The cast housing 11 has an integral case mounting base 14 including holes 15 enabling the exciter apparatus 10 to be secured to mounts 16 bolted to the side plates 17 of screening apparatus 20.

The cast housing 11 has secured thereto two pairs of opposed bearings 21 located in recesses machined in the housing 11, the bearings 21 being retained by respective bearing retainers 22. A pair of shafts 23 are mounted for rotation in their respective bearing 21 pairs and extend out of both sides of the cast housing through their respective bearing retainers 22. A gear assembly 24 comprises a hub 25 to which is machine screwed a gear 26. A gear assembly 24 is keyed to each shaft 23 with keys 27 to form a gear train coupling the shafts 23.

The outer ends of each of the shafts 23 are provided with eccentric masses 30 secured to their respective shaft 23 ends by split clamping portions 31 and clamping bolts 32. The eccentric masses 30 are aligned on their respective shafts 23 and are 180° out of phase between the shafts 23. End float of the eccentric masses 30 is constrained by a shoulder 33 machined on each end portion of the shafts 23 and an axial retainer 34 bolted to each end of the shafts 23.

The outer faces of the outboard eccentric masses 30 mount drive spools 35 having drive flanges 36 adapted to be driven by electric motors (not shown). The outer faces of the inboard eccentric masses 30 mount coupling spools 37 having flanges 40 adapted to accept flexible couplings for joining exciter units together. The exciter assembly 10 is provided with a lifting eye 41 screwed into the casting 11. The gear assemblies 24 and bearings 21 are partially immersed in oil which is introduced through oil lines 42 to the bearings 21 via drillings in the bearing retainers 22, the oil being maintained at level by selective aspiration through extractors 43. A drain plug 44 is also provided.

The gears 26 in this embodiment comprise 9 teeth 45 of an 18-tooth module at 325.0 mm pitch circle diameter 46 (PCD) and 65 mm axial dimension. The gears 26 are mounted to the hubs 25 by machine screws through holes 47 at 194 mm PCD. The lands 50 between the teeth are at a notional diameter 262.6 mm, the teeth having a corresponding notional tooth height of 31.2 mm to the PCD. The gear tooth chordal length 51 at 34 mm is oversize for the module and the gear tooth involute surface extends past the gear tooth addendum to meet a 6.5 mm radius tooth tip 52. This arrangement gives a pressure angle of 20°. The gear tooth dedendum is oversize and flat. The gear tooth profile tapers inward at 50 at the base 53 of the tooth. The teeth are radiused at 5 mm at 54. This configuration gives a lash of 9°. Apparatus configured in accordance with the foregoing embodiment is advantageously operated at 16 Hz and is suited to operating a 6.5 tonne machine of the type illustrated in FIG. 8.

The shafts 23 are sealed to the bearing retainers 22 via a grease purged labyrinth 55, a V-ring grease seal 56 and a lip oil seal and slinger 57.

Figure 8:
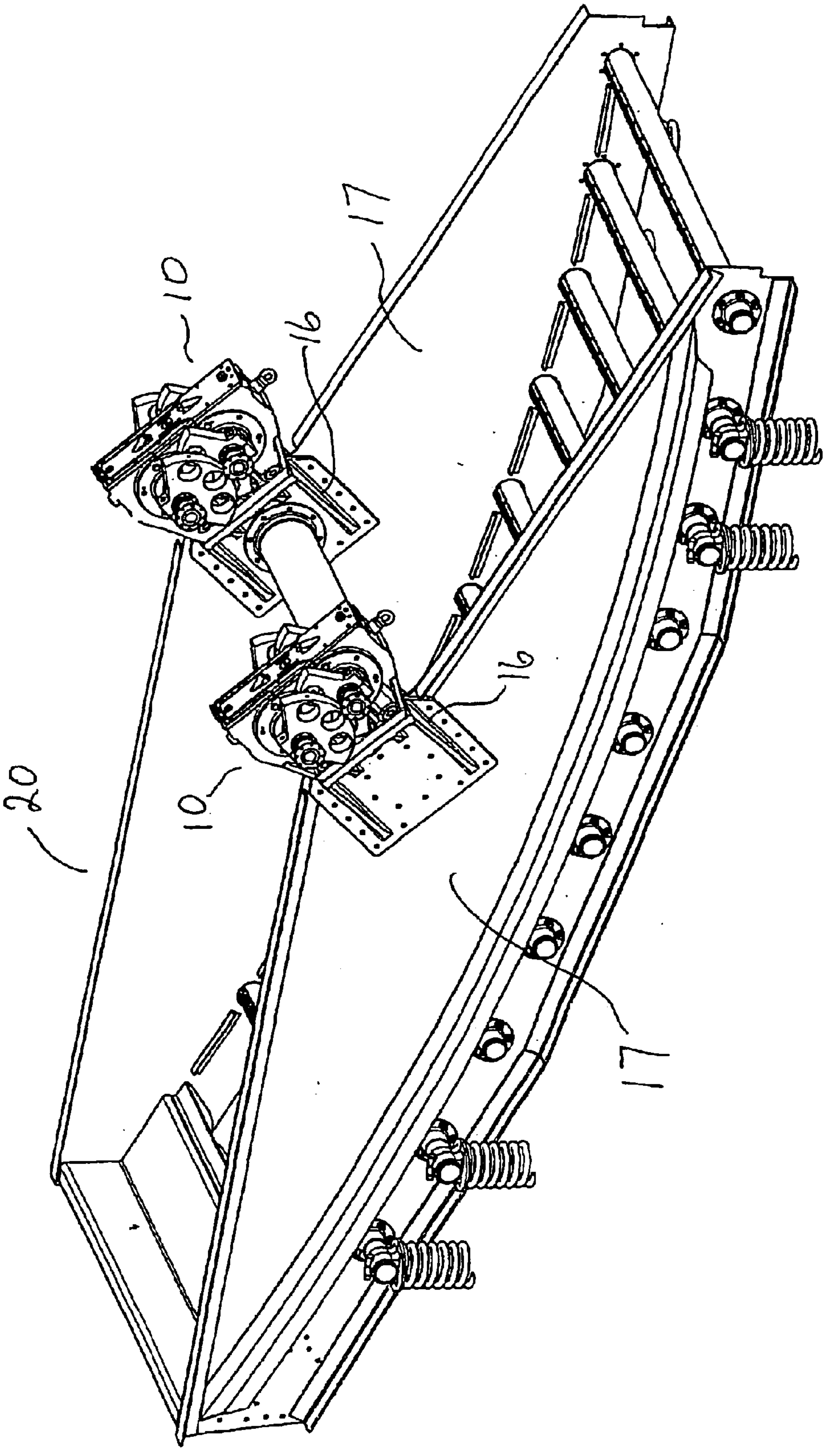
FIG. 8 is a perspective view of screening apparatus showing the apparatus of FIGS. 1 to 4 in use.

In FIG. 8 there is provided a screening apparatus comprising the described exciter apparatus, wherein the side plates 17 are interconnected via a torque tube 60 welded to the mounts 16. The side plates 17 are engineered with stiffeners 61 and the torque tube 60 stiffness is selected whereby the modes of vibration of the assembled apparatus are at least ±2 and preferably ±4 hertz separated from the 16 Hz operating frequency.

It will of course be realised that while the above has been given by way of illustrative example of this invention, all such and other modifications and variations thereto as would be apparent to persons skilled in the art are deemed to fall within the broad scope and ambit of this invention as defined in the claims appended hereto.

We claim:

1. An exciter apparatus comprising a pair of counter-rotating eccentric masses on respective driven shafts mounted for rotation in an exciter body on a screen machine, said masses having a phase relationship that provides a net direction of excitation and wherein said masses are coupled by synchronization means comprising a gear train coupling said shafts and selected to bring said masses substantially into said phase relationship, said drive shafts having respective drive means selected to allow substantially independent rotation of said drive shafts at said phase relationship, and wherein the median of said direction of excitation being selected to pass through the notional centre of gravity of the screen machine; and adjustment means adapted to dynamically align said net direction of excitation with the centre of gravity of said screen in use and provided by allowing a lash of from 2 to 10°, measured at said shafts in said gear train.

2. The exciter apparatus according to claim 1, wherein said lash is about ±4.0 to 4.5° each side of zero lash, measured at said shafts.

3. The exciter apparatus according to claim 1, wherein said gear train consists of one gear on each shaft.

4. The exciter apparatus according to claim 1, wherein said gears are based on a standard gear modified by having an increased tooth involute surface height and the chordal length of each tooth is increased over the standard tooth chord by a degree selected to accommodate the expected shock loadings, and having every second tooth removed relative to said standard gear to allow for said increased chordal length.

5. The exciter apparatus according to claim 1, when used in a screen machine including:

a pair of opposed side walls each having an exciter mount located substantially symmetrically over the upper edge of said side walls in the region of a torsion member rigidly secured between the side walls and providing an upper cross member there between, and screen deck support members disposed between said side walls, said side walls and torsion member being selected to provide that the first fundamental frequency mode greater than said frequency of operation is at least 2 Hz greater than said frequency of operation and the first fundamental frequency below said frequency of operation is at least 2 Hz lower than said frequency of operation.

6. The exciter apparatus according to claim 5, wherein said lash is about ±4.0 to 4.5° each side of zero lash, measured at said shafts.

7. An exciter apparatus comprising:

a pair of counter rotating eccentric masses on respective driven shafts mounted for rotation in an exciter body on a screen machine, said masses having a phase relationship that provides a net direction of excitation, the median of said direction of excitation passing through the notional centre of gravity of the screen machine;

adjustment means comprising a mounting assembly disposed between said exciter body and said screen machine and operable to provide for relative movement thereof, and inertial sensing means adapted to locate the current centre of gravity of the screen machine and direct to the operation of the mounting assembly whereby the direction of excitation continuously tracks the centre of gravity.

8. The exciter apparatus according to claim 7, wherein said driven shafts have respective drive means and are coupled by synchronization means selected to substantially maintain said masses in said phase relationship.

9. The exciter apparatus according to claim 7, when used in a screen machine including:

a pair of opposed side walls each having an exciter mount located substantially symmetrically over the upper edge of said side walls in the region of a torsion member rigidly secured between the side walls and providing an upper cross member there between, and screen deck support members disposed between said side walls, said side walls and torsion member being selected to provide that the first fundamental frequency mode greater than said frequency of operation is at least 2 Hz greater than said frequency of operation and the first fundamental frequency below said frequency of operation is at least 2 Hz lower than said frequency of operation.

10. An exciter apparatus comprising a pair of counter-rotating eccentric masses on respective driven shafts mounted for rotation in an exciter body on a screen machine, said shafts being coupled by a gear train selected to bring said masses substantially into a phase relationship which provides a net direction of excitation passing through the notional centre of gravity of the screen machine, wherein said gear train consists of a gear on each shaft and said gear train has a lash of from 2 to 10° measured at said shafts, the drive means for each said shaft being selected to allow substantially independent rotation of said drive shafts at said phase relationship.

11. The exciter apparatus according to claim 10, wherein said lash is about ±4.0 to 4.5° each side of zero lash.

12. The exciter apparatus according to claim 10, wherein said gear train consists of one gear on each shaft.

13. The exciter apparatus according to claim 12, wherein said gears are based on a standard gear modified by having an increased tooth involute surface height and chordal length of each tooth is increased over the standard tooth chord by a degree selected to accommodate the expected shock loadings, and having every second tooth removed relative to said standard gear to allow for said increased chordal length.

14. The exciter apparatus according to claim 10, when used in a screen machine including:

a pair of opposed side walls each having an exciter mount located substantially symmetrically over the upper edge of said side walls in the region of a torsion member rigidly secured between the side walls and providing an upper cross member there between, and screen deck support members disposed between said side walls, said side walls and torsion member being selected to provide that the first fundamental frequency mode greater than said frequency of operation is at least 2 Hz greater than said frequency of operation and the first fundamental frequency below said frequency of operation is at least 2 Hz lower than said frequency of operation.

* * * * *

UNITED STATES PATENT AND TRADEMARK OFFICE

CERTIFICATE OF CORRECTION

PATENT NO. : 6,889,820 B2
DATED : May 10, 2005
INVENTOR(S) : Peter Rubie et al.

It is certified that error appears in the above-identified patent and that said Letters Patent is hereby corrected as shown below:

Title page,
Item [57], ABSTRACT,
Line 5, "shaft t" should read -- shaft to --.

Column 5,
Line 33, "inward at 50" should read -- inward at 5° --.

Signed and Sealed this

Thirtieth Day of August, 2005

JON W. DUDAS
*Director of the United States Patent and Trademark Office*